(12) United States Patent
Marappan et al.

(10) Patent No.: US 9,776,724 B2
(45) Date of Patent: Oct. 3, 2017

(54) VARYING TUBE SIZE OF SEAT TO PROLONG COMFORT IN AEROSPACE VEHICLE (71) Applicant: AMI INDUSTRIES, INC., Colorado Springs, CO (US)

(72) Inventors: Bharath Marappan, Karnataka (IN); Mahesh Virupaxi Hosmani, Karnataka (IN); Akhil Rajagopal Kozhipuram, Karnataka (IN); Skandan Berikai Kuppan, Karnataka (IN)

(73) Assignee: AMI INDUSTRIES, INC., Colorado Springs, CO (US)

( * ) Notice: Subject to any disclaimer, the term of this patent is extended or adjusted under 35 U.S.C. 154(b) by 0 days.

(21) Appl. No.: 14/711,599

(22) Filed: May 13, 2015

(65) Prior Publication Data

US 2016/0332733 A1    Nov. 17, 2016

(51) Int. Cl.
*A47C 7/02* (2006.01)
*B64D 11/06* (2006.01)
*A47C 27/08* (2006.01)
*B60N 2/64* (2006.01)
*A47C 27/10* (2006.01)
*A47C 27/18* (2006.01)
*B60N 2/44* (2006.01)
*B60R 21/18* (2006.01)
(Continued)

(52) U.S. Cl.
CPC ........ *B64D 11/0647* (2014.12); *A47C 27/082* (2013.01); *A47C 27/083* (2013.01); *A47C 27/10* (2013.01); *A47C 27/18* (2013.01); *B60N 2/4415* (2013.01); *B60N 2/64* (2013.01); *A61H 9/00* (2013.01); *B60N 2/66* (2013.01); *B60N 2/665* (2015.04); *B60R 21/16* (2013.01); *B60R 21/18* (2013.01)

(58) Field of Classification Search
CPC . B60N 2/66; B60N 2/665; B60N 2/64; B60N 2/4415; A61H 9/00; B60R 21/18; B60R 21/16; A47C 27/18; A47C 27/10; A47C 27/082; A47C 27/083
USPC ............ 297/452.41, 452.48, 452.35, 452.37, 297/DIG. 1, DIG. 3, DIG. 8
See application file for complete search history.

(56) References Cited

U.S. PATENT DOCUMENTS 2,199,047 A    4/1940    Fisher
3,008,465 A *  11/1961   Gal ................... A61G 7/05776
                                                  251/12
(Continued)

FOREIGN PATENT DOCUMENTS

DE    3804848 A1    8/1989
DE    3804961 A1    8/1989
(Continued)

OTHER PUBLICATIONS

EP SR, Issued Oct. 10, 2016.

*Primary Examiner* — Chi Q Nguyen
(74) *Attorney, Agent, or Firm* — Cantor Colburn LLP

(57) ABSTRACT

A system and method that comprises a plurality of inflatable tubes is provided. The plurality of inflatable tubes comprises a first tube set and a second tube set. The plurality of inflatable tubes is configured to provide a pressure distribution to an object supported by the plurality of inflatable tubes. The first tube set is configured to be inflated and deflated at a predetermined time interval to shift the pressure distribution.

8 Claims, 5 Drawing Sheets

200

201

(51) Int. Cl.
 *A61H 9/00* (2006.01)
 *B60R 21/16* (2006.01)
 *B60N 2/66* (2006.01)

(56) References Cited

U.S. PATENT DOCUMENTS

| | | | | |
|---|---|---|---|---|
| 3,112,956 | A * | 12/1963 | Schick | A47C 7/021 297/219.1 |
| 3,148,391 | A * | 9/1964 | Whitney | A61G 7/05776 297/DIG. 3 |
| 3,276,047 | A * | 10/1966 | Emery | A47C 7/021 297/452.41 |
| 3,653,083 | A * | 4/1972 | Lapidus | A47C 27/081 5/709 |
| 4,114,325 | A * | 9/1978 | Hochstein | E04H 15/20 52/2.21 |
| 4,175,297 | A | 11/1979 | Richardson et al. | |
| 4,852,195 | A | 8/1989 | Schulman | |
| 5,142,717 | A * | 9/1992 | Everard | A47C 27/083 5/709 |
| 5,396,671 | A * | 3/1995 | Stacy | A61G 7/05776 297/DIG. 3 |
| 5,487,197 | A * | 1/1996 | Iskra, Jr. | A47C 7/021 297/452.41 |
| 5,539,942 | A * | 7/1996 | Melou | A61G 7/05776 5/655.3 |
| 5,701,622 | A * | 12/1997 | Biggie | A61G 7/05776 5/710 |
| 5,765,915 | A | 6/1998 | Lee | |
| 5,873,137 | A | 2/1999 | Yavets-Chen | |
| 5,963,997 | A * | 10/1999 | Hagopian | A61G 7/05776 5/654 |
| 6,088,643 | A | 7/2000 | Long et al. | |
| 6,349,439 | B1 * | 2/2002 | Cook | A61G 7/05776 5/706 |
| 6,560,803 | B2 | 5/2003 | Zur | |
| 6,682,059 | B1 | 1/2004 | Daniels et al. | |
| 6,711,771 | B2 * | 3/2004 | Cook | A61G 7/05776 5/706 |
| 6,996,867 | B2 * | 2/2006 | Boso | A47C 27/082 5/424 |
| 7,464,506 | B2 * | 12/2008 | Atkinson | E04H 9/14 52/2.11 |
| 7,849,544 | B2 * | 12/2010 | Flocard | A61G 7/05769 5/710 |
| 8,104,126 | B2 | 1/2012 | Caminade et al. | |
| 8,573,690 | B2 * | 11/2013 | Shoji | B60N 2/4242 297/216.1 |
| 8,827,371 | B2 | 9/2014 | Brncick et al. | |
| 2002/0108180 | A1 | 8/2002 | Odderson | |
| 2002/0195855 | A1 | 12/2002 | Teppo et al. | |
| 2003/0145386 | A1 * | 8/2003 | Kemp | A61G 7/05776 5/713 |
| 2004/0261182 | A1 * | 12/2004 | Biggie | A61G 7/05776 5/713 |
| 2005/0082895 | A1 | 4/2005 | Kimmig | |
| 2008/0277985 | A1 | 11/2008 | Petzel | |
| 2010/0026067 | A1 | 2/2010 | Striegel | |
| 2014/0070593 | A1 | 3/2014 | Hughes et al. | |
| 2014/0097661 | A1 | 4/2014 | Loher | |
| 2014/0232155 | A1 | 8/2014 | Bocsanyi | |
| 2014/0284988 | A1 | 9/2014 | Gefen | |
| 2014/0319890 | A1 | 10/2014 | Rivera | |
| 2014/0346836 | A1 | 11/2014 | Briggs et al. | |
| 2014/0346837 | A1 | 11/2014 | Brncick et al. | |

FOREIGN PATENT DOCUMENTS

| | | |
|---|---|---|
| EP | 0489310 A1 | 6/1992 |
| GB | 2406507 A | 4/2005 |
| GB | 2419286 A | 4/2006 |
| WO | 0003628 A2 | 1/2000 |
| WO | 0117402 A1 | 3/2001 |
| WO | 0313907 A2 | 2/2003 |
| WO | 2007020219 A1 | 2/2007 |
| WO | 2015039701 A1 | 3/2015 |

* cited by examiner

VARYING TUBE SIZE OF SEAT TO PROLONG COMFORT IN AEROSPACE VEHICLE

BACKGROUND OF THE INVENTION

In general, prolonged period of seating causes poor blood circulation and compression of body tissues resulting in discomfort, numbness, and/or soreness to occupant. For example, fighter flights may require a pilot to be seated for many hours in a cramped cockpit that allows little movement; causes discomfort, numbness, and/or soreness; and effects performance capabilities of the pilot. To avoid discomfort, numbness, and/or soreness, the occupant generally resorts to fidgeting.

BRIEF DESCRIPTION OF THE INVENTION

According to one embodiment, a plurality of inflatable tubes is provided. The plurality of inflatable tubes comprises a first tube set and a second tube set. The plurality of inflatable tubes is configured to provide a pressure distribution to an object supported by the plurality of inflatable tubes. The first tube set is configured to be inflated and deflated at a predetermined time interval to shift the pressure distribution.

According to one embodiment, a repositioning method is provided. The repositioning method comprises providing a pressure distribution to an object supported by a plurality of inflatable tubes comprising a first tube set and a second tube set, and shifting the pressure distribution by inflating and deflating the first tube set at a predetermined time interval Additional features and advantages are realized through the techniques of embodiments herein. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

A detailed description of one or more embodiments of the disclosed apparatus and method are presented herein by way of exemplification and not limitation with reference to the Figures.

As indicated above, occupants seated for prolonged periods generally resort to fidgeting to avoid discomfort, numbness, and/or soreness. Thus, what is needed is a mechanism that prevents pressure related discomfort in lieu of fidgeting.

In general, embodiments disclosed herein may include a system, method, and/or computer program product (herein repositioning system) for preventing pressure related discomfort by varying an amount of pressure exerted on a unit area of a posterior of an occupant with respect to a time. The amount of pressure exerted can be determined by a seating posture, a weight (load) applied through that unit area of contact between a body of the occupant and a contacting surface, and properties of the contact surface. The repositioning system reduces pressure duration applied to a surface by moving (e.g., repositioning) peak pressure points regularly (e.g., periodically), thereby altering constantly or at predetermined intervals a pressure distribution of the amount of pressure exerted on the unit area. The repositioning system may be employed in any apparatus for supporting an occupant, examples of which include aircraft seats, medical seats, wheel chairs, hospital beds, automobile seats, high comfort seat, massaging seat etc.

In one embodiment, the repositioning system may be implemented in an aircraft. The flight seat further includes the repositioning system housed within a seated portion of the flight seat. The repositioning system comprises a soft foam cushion supported by a seat structure and tubes.

The soft foam cushion provides a continuous surface for direct contact with the posterior of the occupant and can provide comfort in case of failure of the tubes. The seat structure is a hard surface on which the tubes rest and expand. The tubes can be air-inflated hoses of varying diameters. Example diameters of each tubes of the first set of tubes include 0.25, 0.5, 0.75, 1.0, 1.25, 1.5, 1.75, 2.0, 2.25, etc. The tubes may be inflated to and from any pressure sufficient for supporting varying pressure points. Examples of an air pressure range include 0 to 4 pounds per square inch, 1 to 4.5 pounds per square inch, 0.5 to 2.1 pounds per square inch, and the like.

Note that, in some embodiments, the repositioning system can either include or exclude the soft foam seat cushion. In the case of exclusion, an occupant may directly sit on the tubes. In either case of exclusion or inclusion the repositioning system may be wrapped in a fabric.

Figure 1:
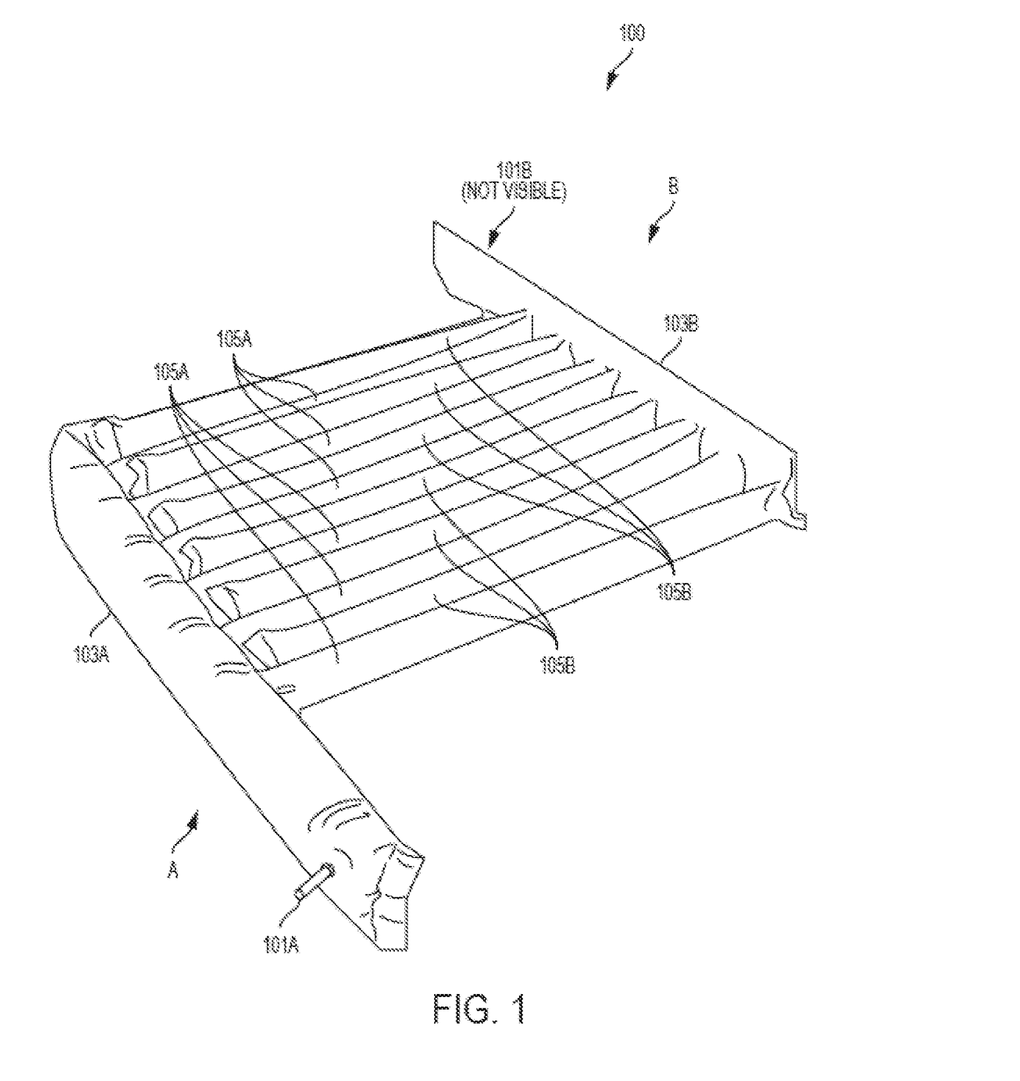
FIG. 1 illustrates a tube subsystem of a repositioning system in accordance with an embodiment.

Turning now to FIG. 1, an embodiment of the tubes of the repositioning system described above is depicted as a tube sub-system 100. The tube subsystem 100 includes a first tube section A and a second tube section B. The tube sections A, B include valves 101A, 101B, feeder tubes 103A, 103B, and support tubes 105A, 105B. In general, air can be fed through each valve 101A, 101B to the feeders tubes 103A, 103B and the support tubes 105A, 105B at varying pressure rates and intervals such that each tube section A and B is independently inflated and deflated in accordance with a desired pressure distribution by a compressor and/or regulator (e.g., controlled by a processing system 500 as described below with respect to FIG. 5). Embodiments of example operations of the repositioning system will now be described with respect to FIGS. 2-4.

Figure 2:
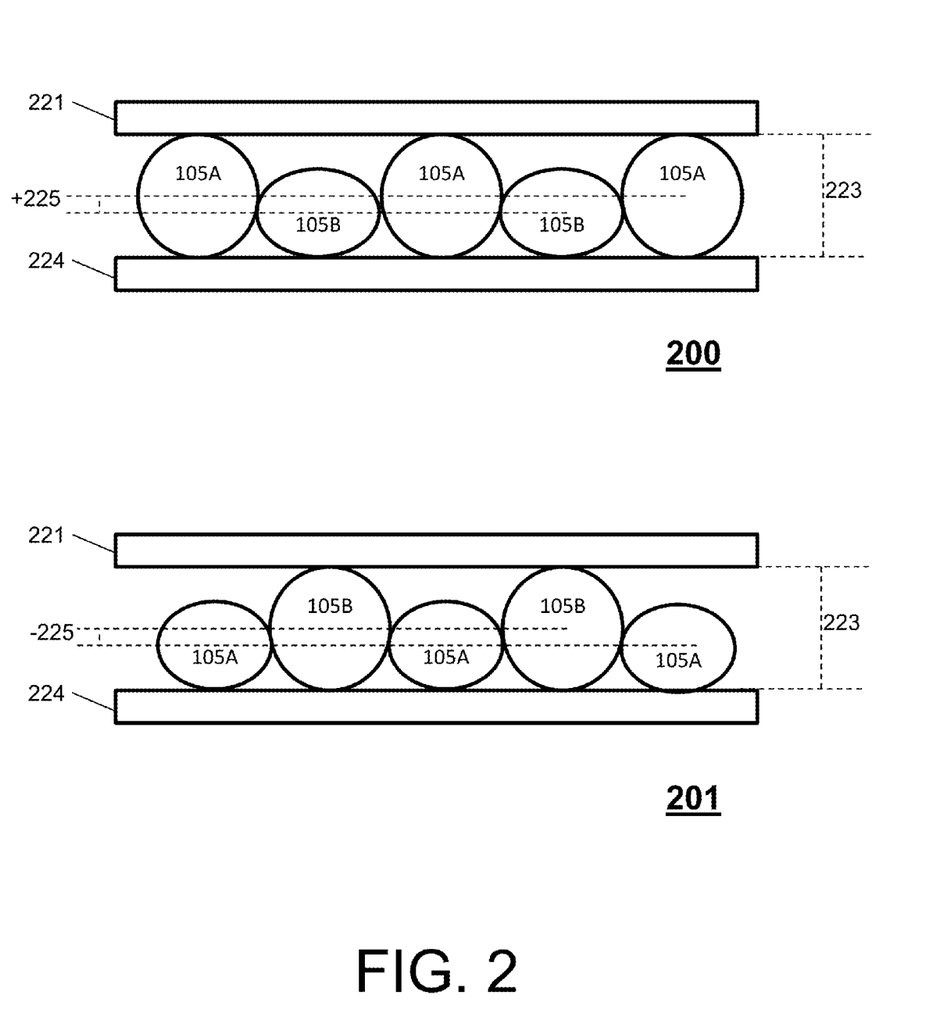
FIG. 2 illustrates operational examples of a tube subsystem of a repositioning system in accordance with an embodiment.

Turning now to FIG. 2, a transition by the repositioning system between a first arrangement 200 and a second arrangement 201 is depicted. Each arrangement 200, 201 illustrates a soft foam cushion 221 separated by a plurality of alternating tubes (e.g., a first set of tubes 105A and a second set of tubes 105B) at a first distance 223 from a seat structure 224. The diameter of each tube of both tube sets is equivalent when all tubes are fully inflated.

In the first arrangement 200, the first set of tubes 105A is fully inflated to maintain the first distance 223. Further, a straight line denoting geometric centers of each of the first set of tubes 105A is at a second distance 225 from a straight line denoting geometric centers of each of the second set of tubes 105B.

In the second arrangement 201, the second set of tubes 105B is fully inflated to also maintain the first distance 223. Further, a straight line denoting geometric centers of each of the second set of tubes 105B is at the second distance 225 from a straight line denoting geometric centers of each of the first set of tubes 105A. Note that the polarity of the second distance 225 changes in accordance with which tube set is inflated.

In operation, the repositioning system changes the pressure in each tube set in a sequential manner to maintain the first distance 223, which switches pressure points between positions on the soft foam cushion 221 relative to the geometric centers of each inflated set of tubes (e.g., the pressure points are in-line with where each inflated tube contacts the soft foam cushion 221). Each set of tubes in the repositioning system may change the pressure with respect to $$P = P0 + T * \frac{dP}{dT},$$

where P is the current pressure in a particular set of tubes, P0 is the initial pressure of that set of tubes such as zero, T is a predetermined time interval, such as 5 minutes, 10 minutes, 15 minutes, etc., and $$\frac{dP}{dT}$$

is a predetermined rate of change of pressure (which could be negative or positive). Note that the above pressure change equation may be applied independently to each tube set of the repositioning system.

For example, at a time T=0, the repositioning system maintains the sets of tubes at their initial pressures, which can be denoted by $P0_A$ and $P0_B$, where $P0_A$ is the initial pressure of first set of tubes 105A and $P0_B$ is the initial pressure of the second set of tubes 105B. Then, at T=1 (i.e., the next interval), the repositioning system increases the pressure of the first set of tubes 105A (inflate) by a value of $$\frac{dP}{dT}A$$

while decreasing the pressure of the second set of tubes 105B (deflate) by a value of $$\frac{dP}{dT}B.$$

In this way, at each odd interval value of time, the repositioning system inflates the first set of tubes 105A and deflates the second set of tubes 105B. Further, at each even interval value of time, the repositioning system inflates the second set of tubes 105B and deflates the first set of tubes 105A.

Thus, the first set of tubes 105B provides a set of pressure points to the soft foam cushion 221 at each odd interval value, and the second set of tubes 105A provides a set of pressure points to the soft foam cushion 221 at time each even interval value.

Figure 3:
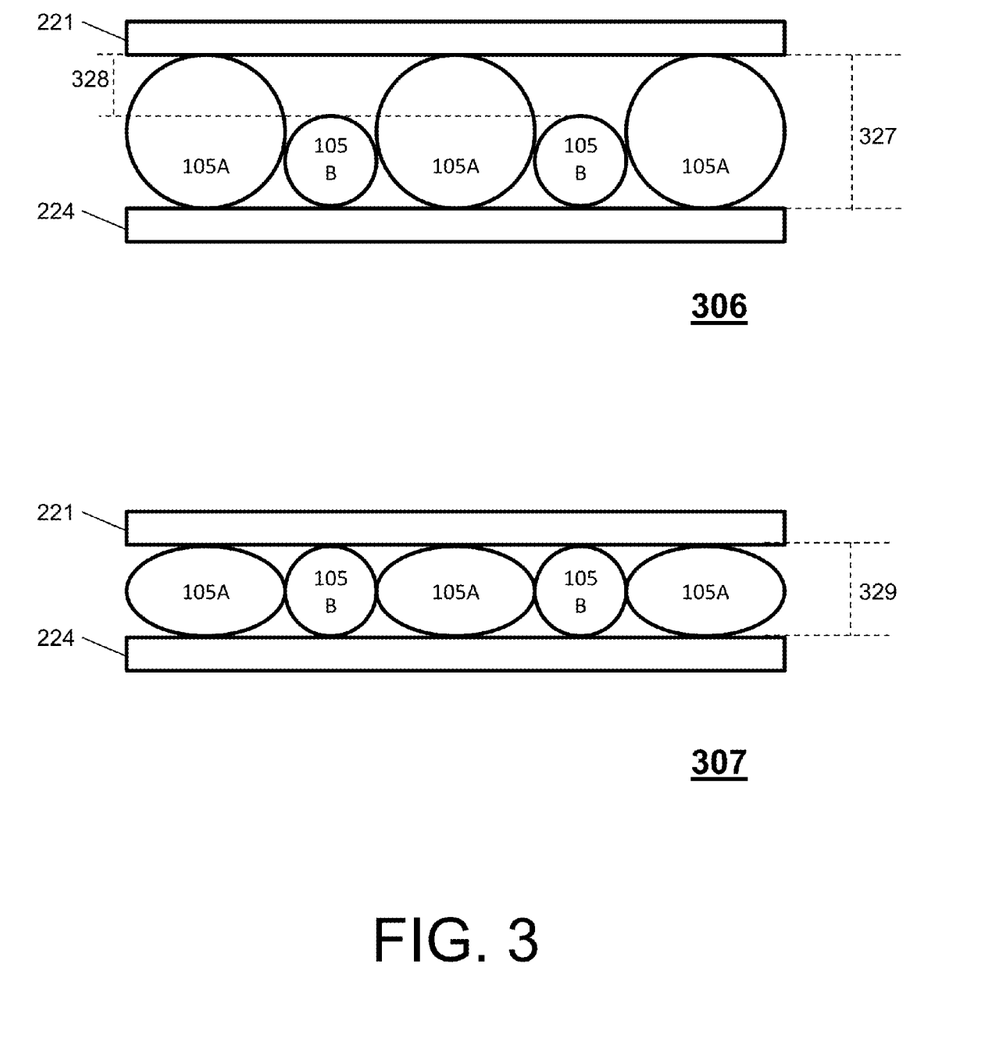
FIG. 3 illustrates another operational example of a tube subsystem of a repositioning system in accordance with an embodiment.

Turning now to FIG. 3, a transition by the repositioning system between a first arrangement 306 and a second arrangement 307 is depicted. Each arrangement 306, 607 illustrates a soft foam cushion 221 separated by a plurality of alternating tubes (e.g., a first set of tubes 105A and a second set of tubes 105B) from a seat structure 224. The diameter of each tube of the first set of tubes 105A is larger than the diameter of each tube of the second set of tubes 105B, when all tubes are fully inflated.

In the first arrangement 306, the first set of tubes 105A is fully inflated to maintain a first distance 327. Further, a straight line tangential to the top surface of the first set of tubes 105A is at a second distance 328 from a straight line tangential to the top surface of the second set of tubes 105B. Note that the second set of tubes 105B is also fully inflated.

In the second arrangement 307, the first set of tubes 105A is deflated to enable the second set of tubes 105B to contact the soft foam cushion 221. In this way, a third distance 39 is established between the soft foam cushion 221 and the seat structure 224. The third distance 329 is the difference between the first distance 327 and the second distance 328.

Thus, in operation, the repositioning system varies the pressure in each tube of the first set of tubes 105A to switch the pressure points between positions on the soft foam cushion 221 relative to the geometric centers of each inflated set of tubes. The repositioning system may also change the pressure with respect to $$P = P0 + T * \frac{dP}{dT}.$$

For example, at a time T=0, the repositioning system maintains both the sets of tubes 105A, 105B at their initial pressures, which can be denoted by $P0_A$ and $P0_B$, where $P0_A$ is the initial pressure of first set of tubes 105A and $P0_B$ is the initial pressure of the second set of tubes 105B. Then, at T=1 (i.e., the next interval), the repositioning system deflates the first set of tubes 105A, while leaving the second set of tubes 105B inflated. In this way, at each odd interval value of time, the second set of tubes 105B provides a set of pressure points to the soft foam cushion 221. Further, the first set of tubes 105A provides a different set of pressure points to the soft foam cushion 221 at each even interval value of time.

Figure 4:
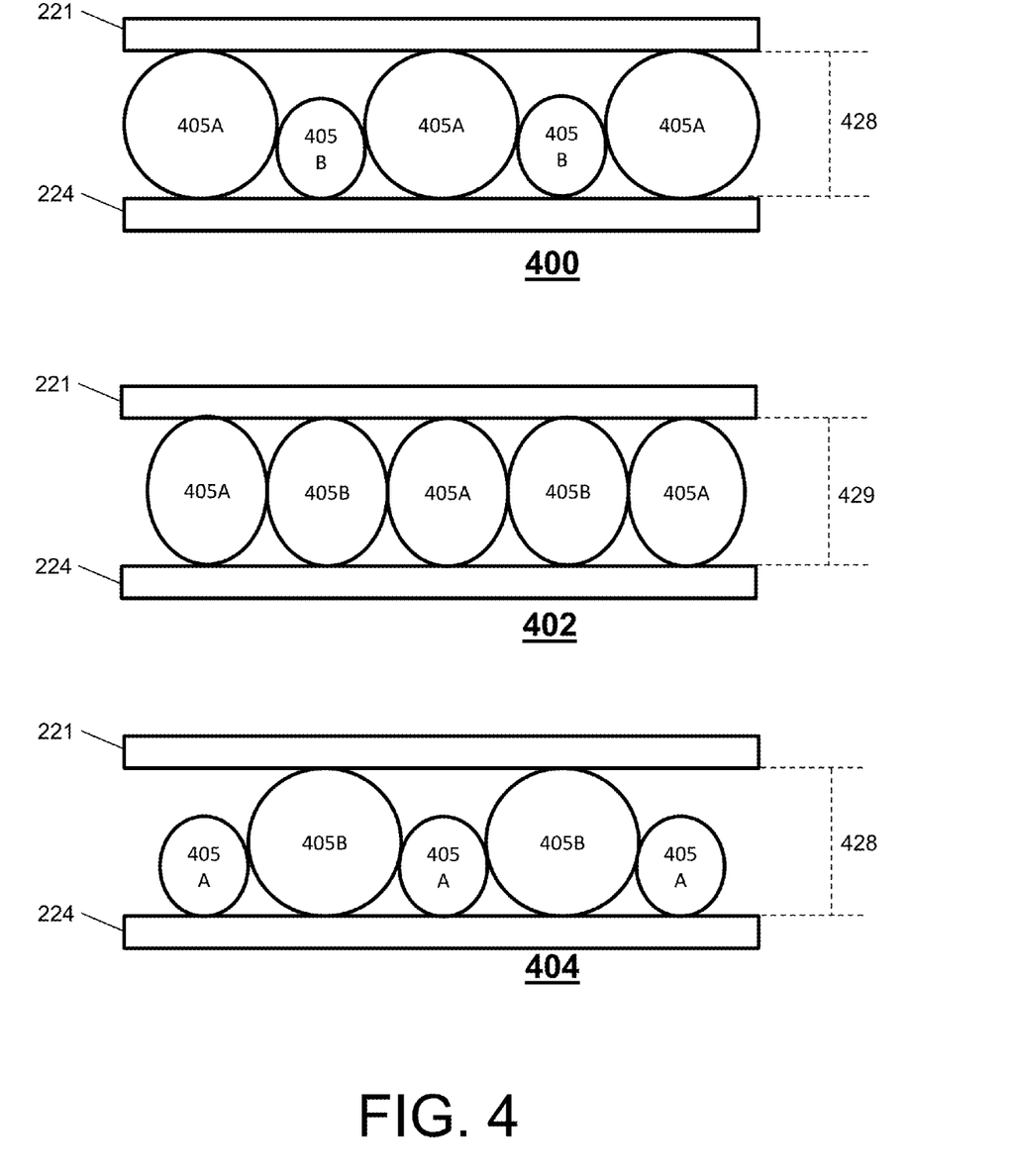
FIG. 4 illustrates another operational example of a tube subsystem of a repositioning system in accordance with an embodiment.

Turning now to FIG. 4, a transition by the repositioning system between a first arrangement 400, a second arrangement 402, and a third arrangement 404 is depicted. Each arrangement 400, 402, 404 illustrates a soft foam cushion 221 separated by a plurality of alternating tubes (e.g., a first set of tubes 405A and a second set of tubes 405B) at a distance 428 or 429 from the seat structure 224. The diameters of each tube of both sets of tubes are equivalent when all tubes are fully inflated.

In the first arrangement 400, the first set of tubes 405A is fully inflated to maintain the distance 428. In the second arrangement 402, all of the tubes 405A, 405B are partially inflated to maintain the distance 429. Note that in the second arrangement, the partially inflated tubes support one another laterally. In the third arrangement 404, the second set of tubes 405B is fully inflated to maintain the distance 428. As shown in FIG. 4, each tube remains in contact with seat structure 224.

In operation, the repositioning system changes the pressure in each tube set in a sequential manner to maintain the distance 49, while at least any one set of tubes 405A or 405B are in their fully inflated condition, or to maintain the distance 429, while both tubes are in their partially inflated condition, which switches pressure points between positions on the soft foam cushion 221 relative to the geometric centers of each inflated set of tubes (e.g., the pressure points are in-line with where each inflated tube contacts the soft foam cushion 221). Each set of tubes in the repositioning system may also change the pressure with respect to $$P = P0 + T * \frac{dP}{dT}$$

where P is the current pressure in a particular set of tubes, P0 is the initial pressure of that set of tubes such as zero, T is a predetermined time interval, such as 5 minutes, 10 minutes, 15 minutes, etc., and $$\frac{dP}{dT}$$

is a predetermined rate of change of pressure (which could be negative or positive).

For example, at a time T=0, the repositioning system maintains both the sets of tubes 405A and 405B at their initial pressures, which can be denoted by $P0_A$ and $P0_B$, where $P0_A$ is the initial pressure of the first set of tubes 405A and $P0_B$ is the initial pressure of the second set of tubes 405B. Then, at T=1 (i.e., the next interval), the repositioning system partially deflates the first set of tubes 405A and partially inflates the second set of tubes 405B. Then, at T=2 (i.e., the next interval), the repositioning system partially deflates the first set of tubes 45A and partially deflates the second set of tubes 405B. In this way, for every interval of time, the repositioning system changes a set of pressure points to the soft foam cushion 221.

Figure 5:
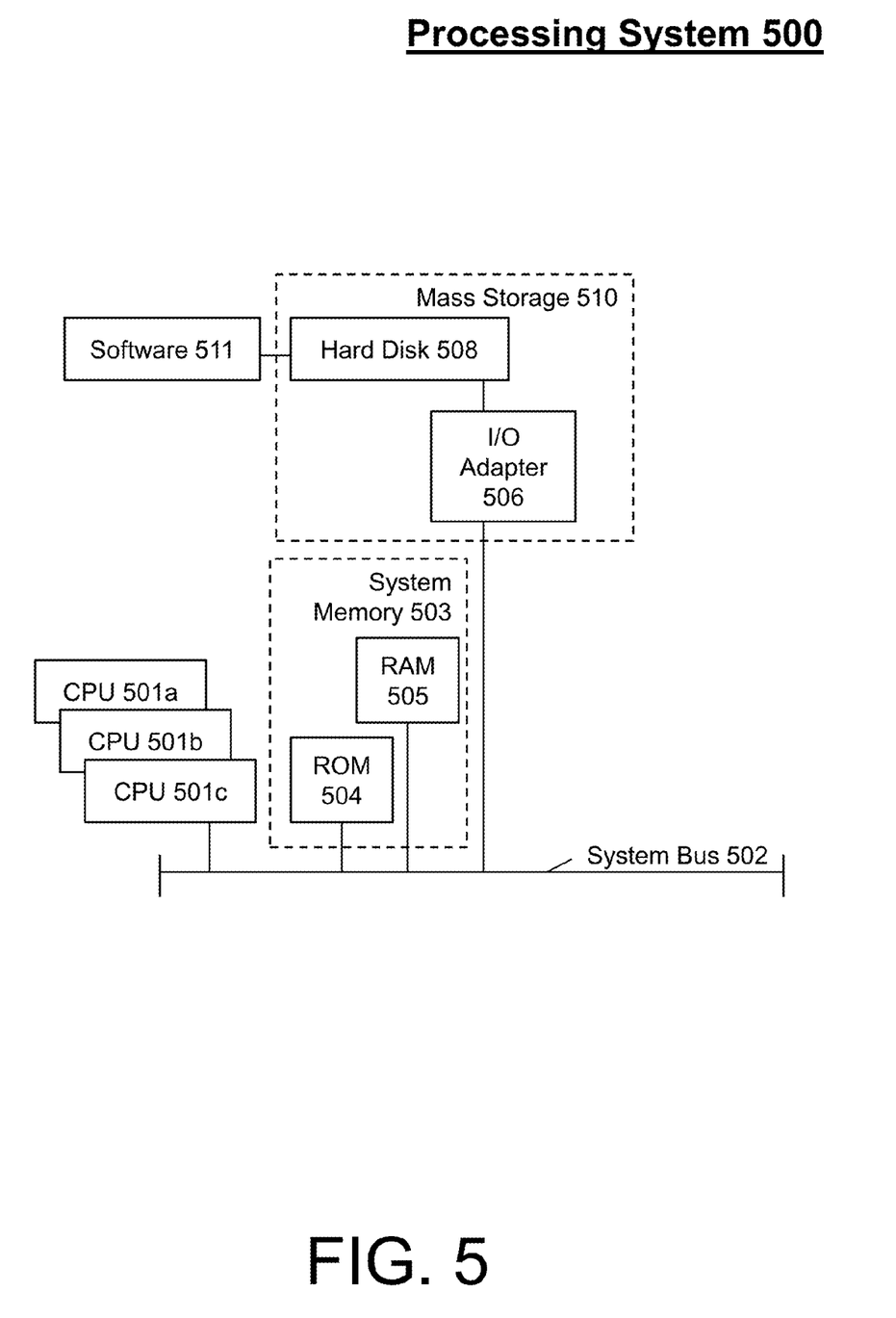
FIG. 5 illustrates a processing system configured to control an operation of a tube subsystem of a repositioning system in accordance with an embodiment.

Referring now to FIG. 5, there is shown an embodiment of a processing system 500 for controlling an operation of the repositioning system. In this embodiment, the processing system 500 has one or more central processing units (processors) 501a, 501b, 501c, etc. (collectively or generically referred to as processor(s) 501). The processors 501, also referred to as processing circuits, are coupled via a system bus 502 to system memory 503 and various other components. The system memory 503 can include read only memory (ROM) 504 and random access memory (RAM) 505. The ROM 504 is coupled to system bus 502 and may include a basic input/output system (BIOS), which controls certain basic functions of the processing system 500. RAM is read-write memory coupled to system bus 502 for use by processors 501.

In addition to the above, the processing system 500 may include an input/output (I/O) adapter 506 and a network adapter 507 coupled to the system bus 502. I/O adapter 506 may be a small computer system interface (SCSI) adapter that communicates with a hard disk 508 or any other similar component. I/O adapter 506 and hard disk 508 may be collectively referred to herein as mass storage 510. Software 511 for execution on processing system 500 may be stored in mass storage 510. The mass storage 510 is an example of a tangible storage medium readable by the processors 501, where the software 511 is stored as instructions for execution by the processors 501 to control the operation of the repositioning system (e.g., controlling the operation of a compressor that inflates and deflates the tube subsystem 100).

In one embodiment, the I/O adapter 506 may be connected to one or more I/O buses that are connected to system bus 502 via an intermediate bus bridge (not shown). Suitable I/O buses for connecting peripheral devices such as hard disk controllers, network adapters, and graphics adapters typically include common protocols, such as the Peripheral Component Interconnect (PCI).

Thus, as configured in FIG. 5, the processing system 500 includes processing capability in the form of processors 501 and storage capability in the form of at least the system memory 503. In one embodiment, a portion of system memory 503 and mass storage 510 collectively store an operating system to coordinate the functions of the various components shown in FIG. 5. Note that in an embodiment, the processing system 500 may be implemented as part of air management system 100, whether local to a testing environment or onboard an aircraft, in communication with the air management system 100.

In view of the above, the technical effects and benefits of embodiments herein include improving comfort of an occupant as pressure points are moved with respect to time, so as to reduce or eliminate tissue compression of the occupant for prolonged period. Further, the technical effects and benefits of embodiments herein include providing the occupant a good massaging effort, which prevents edema formation and blood coagulation. In addition, the technical effects and benefits further include the ability to maintain existing levels of comfort even in case of failure of the repositioning system.

The present invention may be a system, a method, and/or a computer program product. The computer program product may include a computer readable storage medium (or media) having computer readable program instructions thereon for causing a processor to carry out aspects of embodiments herein. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of embodiments herein has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A repositioning system, comprising:
a plurality of inflatable tubes; and
a soft foam cushion supported by the plurality of inflatable tubes,
wherein the plurality of inflatable tubes comprises a first tube set and a second tube set,
wherein the plurality of inflatable tubes are in an alternating parallel arrangement where each tube of the first tube set is separated by a tube of the second tube set, wherein the plurality of inflatable tubes is configured to provide a pressure distribution to an object supported by the plurality of inflatable tubes, wherein the first tube set is configured to be inflated and deflated at a predetermined time interval to shift the pressure distribution, wherein a diameter of each tube of the first tube set is larger than a diameter of each tube of the second tube set when all tubes are fully inflated, wherein the soft foam cushion provides a continuous plane that supports an occupant as the first tube set is inflated and deflated, wherein the first set of tubes when fully inflated maintain a first distance between the soft form cushion and a seat structure, and wherein the second set of tubes when the first set of tubes are deflated maintain a second distance between the soft form cushion and the seat structure.

2. The repositioning system of claim 1, wherein the second tube set is configured to be inflated and deflated in conjunction with the first tube set at the predetermined time interval to shift the pressure distribution.

3. The repositioning system of claim 1, wherein the seat structure is configured to support the plurality of inflatable tubes.

4. The repositioning system of claim 1, further comprising:

a compressor configured to provide air to the plurality of inflatable tubes in accordance with the predetermined time interval.

5. A repositioning method, comprising:

providing a pressure distribution to an object supported by a plurality of inflatable tubes, the plurality of inflatable tubes comprising a first tube set and a second tube set;

supporting a soft form cushion by the plurality of inflatable tube; and shifting the pressure distribution by inflating and deflating the first tube set at a predetermined time interval, wherein the plurality of inflatable tubes are in an alternating parallel arrangement where each tube of the first tube set is separated by a tube of the second tube, wherein a diameter of each tube of the first tube set is larger than a diameter of each tube of the second tube set when all tubes are fully inflated, and wherein the soft form cushion provides a continuous plane that supports an occupant as the first tube set is inflated by a soft foam cushion, wherein the first set of tubes when fully inflated maintain a first distance between the soft form cushion and a seat structure, and wherein the second set of tubes when the first set of tubes are deflated maintain a second distance between the soft form cushion and the seat structure.

6. The repositioning method of claim 5, wherein shifting the pressure distribution comprises:

inflating and deflating the second tube set in conjunction with the first tube set at the predetermined time interval.

7. The repositioning method of claim 5, further comprising:

supporting the plurality of inflatable tubes by the seat structure.

8. The repositioning method of claim 5, further comprising:

providing air to the plurality of inflatable tubes in accordance with the predetermined time interval by a compressor.

* * * * *